3,052,710
POLYFLUOROPERHALOCARBON BORONIC ACID ESTERS

Earl Leonard Muetterties, West Chester, Pa., and George William Parshall, Newark, Del., assignors to E. I. du Pont de Nemours and Company, Wilmington, Del., a corporation of Delaware
No Drawing. Filed Jan. 29, 1960, Ser. No. 5,344
21 Claims. (Cl. 260—462)

This invention relates to a new class of boronic esters and more specifically to the polyfluoroperhalocarbyl esters of boronic acids.

Hydrocarbyl borate and boronate esters are, of course, well known. Recently, Gerrard, J. Chem. Soc. 1955, 505, reported the preparation of a highly halogenated borate ester tris(1,1,1,3,3,3-hexachloro-2-propyl)borate and found this highly halogenated ester to be remarkably resistant to hydrolysis either by water or by refluxing 0.1 N sodium hydroxide solution.

In accordance with the present invention, polyfluoroperhalocarbyl esters of boronic acids are prepared, which surprisingly, are readily hydrolyzable and afford an easy route to polyfluoroperhalo alcohols which were heretofore unknown or difficult to prepare. These new polyfluoroperhaloboronate esters include those of the alkane-, cycloalkane-, aralkane-, arene-, alkarene-, and cycloalkareneboronic acids and the corresponding halogenated boronic acids and are prepared directly by reaction of a boronic acid halide and the necessary stoichiometric proportions of a polyfluoroperhalomono- or 1,2-diketone. This preparative route and the stoichiometry involved will be made clearer from the following two equations:

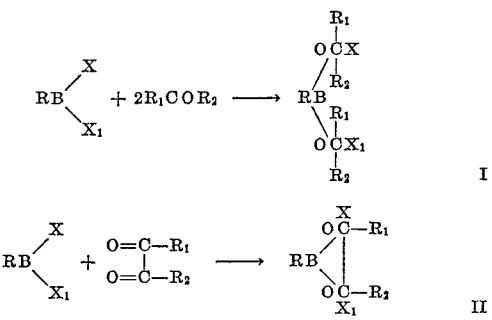

wherein R represents a monovalent hydrocarbon or halohydrocarbon radical free of aliphatic unsaturation, including specifically alkyl, cycloalkyl, aryl, aralkyl, alkaryl, and cycloalkaryl hydrocarbon, and halohydrocarbon, generally of no more than 12 carbons and preferably of no more than eight carbons; X and $X_1$ represent halogens of atomic number from 9 to 53, i.e., fluorine, chlorine, bromine, or iodine, which can be alike or different; and $R_1$ and $R_2$ represent fluoroperhalocarbyl radicals, generally of no more than 12 carbons each and preferably of no more than eight carbons each free of aliphatic unsaturation; $R_1$ and $R_2$ in each ketone and in the resultant boronate esters can be joined together to form with the intervening carbonyl or ester group or groups a carbocycle of from four to six ring members.

The following examples in which the parts are given by weight are submitted to illustrate the invention further and not to limit it.

EXAMPLE I

A mixture of 1.59 parts of phenyldichloroborane, i.e., phenylboron dichloride, and 4.45 parts (2.5 molar proportions based on the boron compound) of perfluorocyclobutanone was charged into a cylindrical glass reactor of internal capacity corresponding to 20 parts of water cooled in a liquid nitrogen bath. The reactor was sealed, allowed to warm to room temperature, and let stand under these conditions overnight. The reactor was then cooled in a liquid nitrogen bath, opened, evacuated to a pressure corresponding to 0.1 mm. of mercury, and the unreacted perfluorocyclobutanone removed by distillation under reduced pressure. The light brown liquid residue corresponding in volume to about four parts of water was fractionated by distillation through a precision distillation column. There was thus obtained 1.9 parts (37% of theory) of crude bis(1-chloro-2,2,3,3,4,4-hexafluorocyclobutyl) benzeneboronate as a clear, colorless liquid boiling at 97–112° C. at a pressure corresponding to 5 mm. of mercury. There was also obtained in the same distillation 1.2 parts (23% of theory) of pure bis(1-chloro-2,2,3,3,4,4-hexafluorocyclobutyl) benzeneboronate as a clear, colorless liquid boiling at 112–113° C. under a pressure corresponding to 5 mm. of mercury; $n_D^{25}$, 1.4119. Redistillation of the first crude fraction afforded an additional 1.2 parts (making a total of 46% of theory) of bis(1-chloro-2,2,3,3,4,4-hexafluorocyclobutyl) benzeneboronate as a clear, colorless, water reactive liquid, boiling at 52° C. under a pressure corresponding to 0.05 mm. of mercury; $n_D^{25}$, 1.4117. The proton magnetic resonance spectrum of the product exhibited two peaks (3:2) in the appropriate locations for monosubstituted phenyl protons. The fluorine resonance energy spectrum contained a weak-strong strong-weak pattern characteristic of an unsymmetrically substituted hexafluorocyclobutyl group. The infrared spectrum of the product showed the presence of mono-substituted phenyl groups, B—O—C linkages, and strong C—F absorption. These spectral characteristics are wholly consistent with the bis(1-chlorohexafluorocyclobutyl) benzeneboronate structure.

*Analysis.*—Calc'd. for $C_{14}H_5BCl_2F_{12}O_2$: C, 32.6%; H, 1.0%; B, 2.1%; F, 44.3%. Found: C, 32.0%; H, 1.1%; B, 2.2%; F, 44.4%.

EXAMPLE II

A cylindrical glass reactor of internal capacity corresponding to 225 parts of water was charged with a solution of 23 parts of phenyldichloroborane, i.e., phenylboron dichloride, in 67 parts of dichloromethane. The reactor was then cooled in a liquid nitrogen bath and evacuated to a pressure corresponding to 0.1 mm. of mercury, and 19 parts (an equimolar proportion based on the boron compound) of tetrafluorocyclobutane-1,2-dione was then distilled into the reactor under anhydrous conditions. The reactor was then sealed, allowed to warm to room temperature, and let stand under these conditions overnight. The blue characteristic color of the diketone had completely disappeared and a homogeneous, light tan solution remained. The reactor was cooled, opened, and the liquid reaction mixture removed. The dichloromethane solvent was removed by distillation and the pressure in the system was reduced by pumping while maintaining the heat input to the pot with a view toward distilling the product. The residue became extremely viscous, and as heat was applied a small amount of colorless liquid, presumably unreacted phenylboron dichloride, distilled over at 25° C. at a pressure corresponding to 0.3 mm. of mercury. As continued heat was applied, colorless crystals formed in the still head and the distillation was stopped. A portion of the viscous, tan, liquid residue was heated to 50° C. at a pressure corresponding to 0.1 mm. of mercury in a sublimation apparatus to afford white crystals of 3-phenyl-1,5-dichloro-6,6,7,7-tetrafluoro-2,4-dioxa-3-borabicyclo-[3.2.0]heptane. The white crystalline product was resublimed twice to afford 10 parts of the pure 3-phenyl-1,5-dichloro-6,6,7,7-tetrafluoro-2,4-dioxa-3-borabicyclo[3.2.0]-heptane as white needles melting at 55° C. The proton magnetic resonance energy spectrum of the product contained two peaks in a ratio of 3:2 in the region appropriate for monosubstituted phenyl. The fluorine resonance energy spectrum was consistent with a tetrafluorocyclobutane ring. These spectral characteristics are wholly consistent with the 3-phenyl-1,5-dichloro-6,6,7,7-tetrafluoro - 2,4-dioxa-3-borabicyclo[3.2.0]heptane structure.

*Analysis.*—Calcd. for $C_{10}H_5BCl_2F_4O_2$: C, 38.1%; H, 1.6%; B, 3.4%; F, 24.1%. Found: C, 38.3%; H, 1.7%; B, 3.5%; F, 23.6%.

EXAMPLE III

A stainless steel cylindrical reactor of internal capacity corresponding to 30 parts of water was cooled in a liquid nitrogen bath and charged with 12.4 parts of hexafluorocyclobutanone and 3.7 parts (0.5 molar proportion based on the perfluorocyclobutanone) of n-butylboron difluoride, i.e., n-butyldifluoroborane. The reactor was sealed and allowed to stand at room temperature for four days. The reactor was then inverted and the contents poured into a stillpot cooled in liquid nitrogen. The crude liquid reaction mixture was purified by distillation. There was thus obtained 2.3 parts (14% of theory) of diheptafluorocyclobutyl butaneboronate as a clear, colorless liquid boiling at 88–92° C. under a pressure corresponding to 4 mm. of mercury; $n_D^{25}$, 1.3392. The product hydrolyzed to a white solid on exposure to air and gave a characteristic green boron flame on ignition. The proton magnetic resonance energy spectrum was compatible with the presence of an n-butyl group. The fluorine magnetic resonance energy spectrum was compatible with the heptafluorocyclobutoxy group. The infrared spectrum contained strong bands assignable to C—H, C—F, and C—O bonds. These spectral characteristics are wholly consistent with the diheptafluorocyclobutyl butaneboronate structure.

*Analysis.*—Calcd. for $C_{12}H_9BF_{14}O_2$: C, 31.2%; H, 2.0%; B, 2.3%; F, 57.6%. Found: C, 32.5%; H, 2.4%; B, 1.7%; F, 55.7%.

EXAMPLE IV

A thick-walled cylindrical glass reactor of internal capacity corresponding to 25 parts of water was charged with a mixture of 5.6 parts of 1,3-dichloro-1,1,3,3-tetrafluoro-2-propanone and 2.2 parts (0.5 molar proportion based on the ketone) of phenylboron dichloride, i.e., phenyldichloroborane. The reactor was then cooled in a liquid nitrogen bath, evacuated to a pressure corresponding to 0.1 mm. of mercury, and sealed. The reactor was allowed to stand at room temperature for 3.5 days. The reactor was then cooled to 0° C., opened, and the liquid reaction product removed. The reaction mixture was purified by distillation. There was thus obtained one part (13% of theory) of crude bis(1,2,3-trichloro-1,1,3,3-tetrafluoropropyl) benzeneboronate as a clear, colorless liquid boiling at 49–52° C. under a pressure corresponding to 0.5 mm. of mercury. The proton magnetic resonance energy spectrum of the product showed two peaks in a 3:2 ratio in the region appropriate for phenyl hydrogen. The fluorine resonance energy spectrum was also wholly consistent with the bis(1,2,3-trichloro-1,1,3,3-tetrafluoro-2-propyl) benzeneboronate structure.

EXAMPLE V

Two 0.8-part samples of a commercial polyvinyl alcohol of medium viscosity containing 88% free hydroxyl groups were soaked in 20 part-portions of the dimethyl ether of diethylene glycol for 20 hours. Bis(1-chloro-2,2,3,3,4,4-hexafluorocyclobutyl) benzeneboronate (0.3 part) of Example I was added to one of the polymer suspensions and both suspensions were heated to 115° C. over a period of ten minutes. The polymer samples were recovered from the two mixtures. The polymer treated with the bis(1-chloro-2,2,3,3,4,4-hexafluorocyclobutyl) benzeneboronate was insoluble in water at room temperature and even at 90–100° C. after two hours. In contrast, the untreated polymer control was readily soluble in both hot and cold water, as was the initial starting commercial polyvinyl alcohol.

As is apparent from the foregoing, the present invention is generic to the polyfluoroperhalocarbyl esters of hydrocarbon and halohydrocarbon boronic acids, and to their preparation by the direct reaction between the requisite boronic acid dihalide and the necessary stoichiometric portions of the requisite polyfluoroperhalomonoketones or 1,2-diketones, in which latter case the cyclic polyfluoroperhalocarbyl boronate esters are obtained.

The reaction is a simple one and requires no complicated operating procedures or equipment. Generally the reaction is carried out in sealed reactors of which the most convenient are glass or glass-lined reactors. Certain procedures are desirable in some instances because of the relatively low boiling nature of some of the polyfluoroperhaloketones, e.g., perfluoroacetone, perfluorocyclobutanone, and perfluorocyclobutane-1,2-dione. The extreme chemical reactivity of some of the polyfluoroperhaloketones, e.g., with, for instance, water, and in some instances with the hydrocarbon or halohydrocarbon boronic acid dihalides, present will also make it advisable to take certain precautions. The preparation of compounds of the invention will generally be carried out by cooling a reactor to liquid nitrogen temperatures or at least to those of solid carbon dioxide, charging the particular polyfluoroperhaloketone or ketones involved as well as the hydrocarbon or halohydrocarbon boronic acid dihalide, sealing the reactor, and then allowing it to warm slowly to room temperature. With the higher boiling polyfluoroperhaloketones, sealed systems are not necessary and are not normally used. The reaction will be simply carried out by charging the coreactants under anhydrous conditions at room temperature and heating the reactor sufficiently to effect reaction.

The esterification reaction is effected thermally. The reaction temperatures and times to be used will depend on the reactivity of the boronic acid dihalide coreactant and more importantly on the reactivity of the polyfluoroperhaloketone coreactant but are not critical. For instance, with perfluorocyclobutanone and perfluorocyclobutane-1,2-dione, the esterification reaction is generally spontaneous, exothermic, and goes to completion without any externally input heat. While these are extreme cases, generally the reaction will be exothermic and appropriate care should be taken in charging the coreactants. Normally after the exothermic reaction has subsided, temperatures no higher than 75–80° C. will usually be all that is needed to complete the reaction. Reaction times will ordinarily vary from a few minutes to a few hours. In the case of the less reactive systems, e.g., with the longer chain acyclic polyfluoroperhaloketones, higher temperatures and longer reaction times generally will be used. Temperatures higher than in the range 100–150° C. will normally not be required. Under these conditions, even with the less reactive polyfluoroperhaloketones, reaction times required will be only a few hours. The pressure under which the reaction is carried out is not critical. In those instances wherein the reaction is carried out in a sealed system, the reaction will normally be effected at elevated pressures. No externally applied pressure is required. The simple autogenous pressure of the reactants under the temperature conditions used will suffice.

The proportions of the reactants to be used is not critical. It is preferred that when using a monoketone reactant, that two moles be used per mole of boronic acid dihalide and that when a diketone is used as the reactant, equimolar amounts of boronic acid dihalide and diketone be used in accordance with the stoichiometry of Equations I and II supra. However excesses of one reactant or the other may be used if desired.

The reaction mixtures are worked up quite simply to obtain the polyfluoroperhalocarbyl boronate esters. Thus, at the completion of the reaction, it is only necessary to open the reactor to atmospheric conditions, distill away any unreacted polyfluoroperhaloketone or boronic acid dihalide, and isolate and purify the desired polyfluoroperhalocarbyl boronate esters, normally by distillation. The majority of the monoketone esters are liquids; whereas, the 1,2-diketone esters are solids. The boiling point of the liquid products and the melting point of the solid products vary, as is usual, with increasing molecular weight of the overall compounds. As the molecular weight of the halogen substituents in the polyfluoroperhalocarbyl moieties increases, the boiling point of the liquids and the melting point of the solids will likewise increase. The solid products will be separated by filtration and, where necessary, can be purified by conventional recrystallization techniques, using such solvents as the aromatic hydrocarbons, e.g., benzene, toluene; the cycloaliphatic hydrocarbons such as cyclohexane, the methylcyclohexanes; and the like. Mixtures of these conventional solvents can also be used.

The reaction can be effected properly in the presence or absence of an inert organic reaction medium, which, if present, should be anhydrous. Any inert liquid organic diluent can be used and, generally speaking, the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite polyfluoroperhaloketone and boronic acid dihalide coreactants are simply mixed as described previously and the product isolated therefrom by distillation, and crystallization where necessary, after the reaction has been completed. The absence of a diluent generally makes separation of unreacted material and the desired products easier.

From the foregoing, it is apparent that in preparing these new polyfluoroperhalocarbyl esters of boronic acids and haloboronic acids, there can be used any polyfluoroperhalocarbyl monoketone or polyfluoroperhalocarbyl 1,2-diketone. These include the acyclic polyfluoroperhalocarbyl ketones and 1,2-diketones. Examples of such suitable ketones in addition to those given in the foregoing more fully detailed examples include acyclic polyfluoroperhaloketones, such as, 1,1,3,3-tetrachloro-1,3-difluoro - 2 - propanone, perfluoro - 2 - propanone, perfluoro - 3 - hexanone, perfluoro - 4 - heptanone, perfluoro-2-pentanone, perfluoro-8-pentadecanone, perfluoro-13-pentacosanone, perfluoro-9-hexadecanone, and the like. Polyfluoroalkylpolyfluoroaryl ketones such as, perfluoroacetophenone, i.e., trifluoromethyl pentafluorophenyl ketone; cycloalkylpolyfluoroperhaloketones, such as perfluorocyclohexyl perfluoromethyl ketone, perfluorocyclohexanone, perfluorocyclopentanone, and the like. Also included in the polyfluoroperhaloketone coreactants are the 2,2 - dihalo - 3,3,4,4 - tetrafluorocyclobutanones wherein the two halogen substituents are of atomic number from 9 to 35, inclusive, i.e., fluorine, chlorine and bromine, alike or different. More specifically, there can be used perfluorocyclobutanone, 2-chloro-2,3,3,4,4-pentafluorocyclobutanone, 2 -bromo - 2,3,3,4,4 - pentafluorocyclobutanone, 2 - bromo - 2- chloro - 3,3,4,4 - tetrafluorocyclobutanone, 2,2 -dichloro - 3,3,4,4 - tetrafluorocyclobutanone, and 2,2-dibromo-3,3,4,4-tetrafluorocyclobutanone.

Of these polyfluorocyclobutanones, the various chlorofluorocyclobutanones have been disclosed in U.S. Patents 2,712,554 and -5. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy-1,3,3,4,4-pentafluoro-2,2-dihalocyclobutanes, all as disclosed and claimed in detail in the coassigned copending application of England Serial No. 717,805, filed February 27, 1958, and now abandoned. These cyclobutanones are generally gaseous to liquid, depending on the total molecular weight which varies with the halogens, quite reactive materials which should preferably be handled under anhydrous conditions. Perfluorocyclobutanone is a new compound per se, and is being claimed in the coassigned copending application of England Serial No. 757,701, filed August 28, 1958, a continuation-in-part of England's above referred to application, Serial No. 717,805, and now abandoned.

*Step I.—Preparation of Methyl Trifluorovinyl Ether*

Methyl trifluorovinyl ether may be prepared (also described in Dixon coassigned and copending Serial No. 642,942 filed February 28, 1957, now U.S. Patent No. 2,917,548) as follows:

A mixture of 33.3 g. (0.62 mole) of dry sodium methoxide and 155 g. of sodium-dried dioxane is placed in a 320-ml. stainless steel bomb. The bomb is sealed, pressured to 300 p.s.i. with tetrafluoroethylene, and heated to 100° C. under agitation. The bomb is repressured with tetrafluoroethylene as is necessary to maintain 300 p.s.i. of pressure. The reaction is continued until no further decrease in pressure occurs. The bomb is cooled and the exit gas is led into traps immersed in a Dry-Ice acetone bath. The greater portion of the recovered material boils below —20° C. but the trap residue is combined with the contents of the bomb and the combined material is distilled through a 12-inch Vigreux column. Material weighing 30.7 g. and boiling in the range 21–45° C. is collected. This material is redistilled through a 3-foot low temperature column packed with glass helices. Nineteen grams of methyl trifluorovinyl ether, boiling at 10.5–12.5° C., is collected. This product strongly reduces potassium permanganate solution and bromine.

*Step II.—Preparation of Perfluorocyclobutyl Methyl Ether*

A thick-walled cylindrical glass reactor is cooled in a liquid nitrogen bath and charged with 11.5 parts of methyl trifluorovinyl ether, 0.5 part of phenothiazine inhibitor, about 0.5 part of a commercially available terpene stabilizer (see U.S. Patent 2,407,405) and 23 parts of tetrafluoroethylene. The reactor is then sealed and heated to 150° C. and held at this temperature for 12 hours. The sealed reactor is allowed to cool to room temperature, cooled to liquid nitrogen temperature, and finally opened to the atmosphere. The reactor is warmed carefully to vent any unreacted tetrafluoroethylene or any dimer thereof formed during the reaction. By work-up of the remaining liquid, there is obtained perfluorocyclobutyl methyl ether, a clear colorless liquid boiling at 56° C. at atmospheric pressure, $n_D^{25}$, 1.2875.

*Step III.—Preparation of Perfluorocyclobutanone Hydrate*

A heavy-walled glass reactor is charged with eight parts of perfluorocyclobutyl methyl ether and 18.8 parts of concentrated sulfuric acid. The reactor and contents are cooled and the reactor sealed and heated at 150° C. for twelve hours. There is thus obtained 5.9 parts of perfluorocyclobutanone hydrate.

*Step IV.—Preparation of Perfluorocyclobutanone*

A glass reactor fitted with a dropping funnel and connected to a trap cooled with a solid carbon-dioxide/acetone bath is charged with 25 parts of phosphorus pentoxide. The reactor and attached system are then evacuated and filled with nitrogen at 200 mm. of mercury pressure. Molten perfluorocyclobutanone hydrate, 16.5 parts, is added through the dropping funnel. On warming the reactor an exothermic reaction occurs and perfluorocyclobutanone collected as a solid in the trap. The ketone boils at about 0–1° C.

As the polyfluoroperhaloketone coreactant there can also be used a polyfluoroperhalocyclobutane-1,2-dione, for instance, tetrafluorocyclobutane-1,2-dione. These new polyfluorocyclobutane-1,2-diones are new compounds per se and are being claimed in the coassigned copending application of England Ser. No. 731,606, filed April 29, 1958, and now abandoned. These polyfluoroperhalocyclobutane-1,2-diones can be readily prepared by cycloaddition between the requisite two polyfluoroperhalovinyl hydrocarbyl ethers (disclosed in detail in copending and coassigned application of McCane, Serial No. 747,352 of July 9, 1958, now U.S. Patent No. 2,982,786), followed by hydrolysis under strong acid conditions of the resultant cyclic dimer, all as disclosed and claimed in detail in the above-referred to copending application. These polyfluoroperhalocyclobutane-1,2-diones are generically gaseous to liquid, depending on the total molecular weight which varies with the halogens, quite reactive materials which should preferably be handled under anhydrous conditions. The preparation of the polyfluoroperhalocyclobutane-1,2-dione, tetrafluorocyclobutane-1,2-dione is illustrated below:

Part A.—Preparation of 1,2-Dimethoxyhexafluorocyclobutane

Each of four thick-walled cylindrical glass reactors, roughly 24 diameters long and of total internal capacity corresponding to 150 parts of water, was cooled in a liquid nitrogen bath and charged with 50 parts of methyl trifluorovinyl ether, 0.5 part of phenothiazine inhibitor, and about 0.3 part of a commercially-available terpene stabilizer (see U.S. Patent 2,407,405). The reactors were sealed and heated to 150° C. and held at this temperature for twelve hours. The reactors were then allowed to cool to room temperature, then cooled to liquid nitrogen temperatures, and finally opened to the atmosphere. The reactors were warmed carefully to vent any unreacted methyl trifluorovinyl ether. The remaining liquid reaction products were combined and fractionated by distillation. There was thus obtained 166 parts (83% of theory) of 1,2-dimethoxyhexafluorocyclobutane as a clear, colorless liquid boiling at 119–120° C. at atmospheric pressure. Similar preparations in which the reaction temperatures were raised to 175° C. and lowered to 125° C. afforded yields of 77% and 40% of theory, respectively, of the 1,2-dimethoxyhexafluorocyclobutane.

Part B.—Preparation of Perfluorocyclobutane-1,2-Dione

A mixture of 60 parts of the above 1,2-dimethoxyhexafluorocyclobutane and about 120 parts of concentrated sulfuric acid in a polyethylene reactor was heated at steam bath temperatures for four hours with stirring. The resulting fuming, brown, slushy reaction mixture was added with stirring to 200 parts of ice. The resulting tan reaction mixture containing some dark solid was extracted four times with a total of about 400 parts of diethyl ether. The ether extracts were combined and dried over anhydrous magnesium sulfate and finally filtered into a glass stillpot. The diethyl ether was removed by heating, maintaining the pot temperature below 80° C. There was thus obtained a nearly white, solid hydrate of perfluoro-1,2-cyclobutanedione.

The pot containing the solid polymeric hydrate was cooled in a solid carbon dioxide/acetone bath, charged with about 50 parts of phosphorus pentoxide, and fitted to a precision fractionation column, the receiving trap of which was likewise cooled in a solid carbon dioxide/acetone bath. The system was flushed well with nitrogen and then evacuated to a pressure corresponding to about 500 mm. of mercury. The pot was then heated, and blue vapors were soon evolved which collected in the cooled trap as a crystalline blue solid. The pot was heated slowly to about 200° C. and held there until blue vapors were no longer evolved. There was thus obtained about 20 parts (about 50% of theory) of perfluoro-1,2-cyclobutanedione as a crystalline blue solid. The product was melted to a blue liquid and poured into a glass stillpot containing about 10 parts of phosphorus pentoxide. Redistillation from this pot through a small precision fractionation column afforded about 15 parts of pure tetrafluorocyclobutane-1,2-dione as a blue liquid boiling at 34–35° C. at atmospheric pressure.

*Analysis.*—Calcd. for $C_4F_4O_2$: F, 48.7%; M.W., 156. Found: F, 48.7%; M.W., 154, 157.5.

Also useful as a polyfluoroperhaloketone coreactant are the acyclic 1,2-polyfluoroperhalo-1,2-diketones. Like the aforesaid just-described polyfluoroperhalocyclobutane-1,2-dione, the acyclic polyfluoroperhalo-1,2-diketone coreactants form with the boronic acid dihalide coreactants cyclic polyfluoroperhaloboronate esters. Suitable specific examples of these acylic polyfluoroperhalo-1,2-diketones include perfluoro-4,5-octanedione, perfluoro-2,3-butanedione, perfluoro-6,7-dodecanedione, 1,10-dichlorohexadecafluoro-5,6-decanedione, and the like. These acyclic polyfluoroperhalo-1,2-diones are new compounds per se and are being claimed in the coassigned copending application of Drysdale, S.N. 825,631 filed June 19, 1959 now U.S. Patent No. 3,012,069. These acyclic polyfluoroperhalo-1,2-diones can be readily prepared by reaction between the requisite polyfluoroperhalocarbacyl halide with nickel carbonyl in benzonitrile as a reaction medium at temperatures no higher than 40° C. to form the corresponding polyfluoroperhaloacyloin ester and enediol diesters. Direct oxidation of the acyloin, which is obtained from the acyloin ester by alcoholysis, forms the desired polyfluoroperhalo-1,2-diketone. Alternatively, the enediol diesters can be pyrolyzed to afford the same polyfluoroperhalo-1,2-diones. The preparation of the acyclic polyfluoroperhalo-1,2-dione, perfluoro-4,5-octanedione is illustrated as follows:

A mixture of 400 parts of benzonitrile, 160 parts of nickel carbonyl, and 1,055 parts of perfluorobutyryl chloride was stirred under anhydrous conditions at room temperature for 72 hours. An additional 100 parts of nickel carbonyl was then added, and the mixture was stirred for an additional 48 hours under the same conditions. Another 100-part portion of nickel carbonyl was then added, and stirring was continued under the same conditions for seven more days. The reaction mixture was then filtered to remove unreacted nickel carbonyl and by-product nickel chloride. Upon distillation of the resultant filtrate, there was obtained 455 parts (51% conversion) of the enediol diester perfluoro-4-octene-4,5-diol di(perfluorobutyrate) as a clear, colorless liquid boiling at 89° C. under a pressure corresponding to 18 mm. of mercury.

A mixture of 73 parts of methanol and 600 parts of the enediol diester perfluoro-4-octene-4,5-diol di(perfluorobutyrate) was stirred at 25° C. As solution took place an exothermic reaction occurred which heated the reaction mixture to reflux temperature. Upon distillation of the reaction product, there was obtained 270 parts of a mixture of methanol and methyl perfluorobutyrate boiling at less than 70° C. under a pressure corresponding to 90 mm. of mercury and 272 parts (90% of theory) of the polyfluoroacyloin 5H - tetradecafluoro - 5 - hydroxy - 4 - octanone as a clear, colorless liquid boiling at 70–72° C. under a pressure corresponding to 90 mm. of mercury; $n_D^{25}$, 1.4940. Infrared analysis showed carbonyl absorption at 5.67 microns and hydroxyl absorption at 2.80 microns.

*Analysis.*—Calcd. for $C_8F_{14}H_2O_2$: F, 67.2%. Found: F, 66.8%.

A stillpot was charged with 100 parts of the acyloin 5H-tetradecafluoro-5-hydroxy-4-octanone, 210 parts of acetic acid, and 66 parts of bismuth triacetate. The pot was connected to a spinning band distillation column of the type described in U.S. Patent 2,712,520, and distillation was begun. About 60 parts of product boiling in the range 90–115° C. at atmospheric pressure was collected. Upon redistillation there was obtained 30 parts of a yellow liquid boiling at 96° C. at atmospheric pressure which, by gas chromatography, was shown to be an azeotrope of acetic acid and prefluoro-4,5-octanedione. The pure perfluoro-4,5-octanedione was recovered from the azeotrope by shaking with water and distilling the resultant perfluoro-4,5-octanedione hydrate from phosphorus pentoxide.

As the coreactants with the just-described polyfluoroperhaloketones and 1,2-diketones to make the new polyfluoroperhaloboronate esters of the present invention, there can be used any boronic acid dihalide. Suitable specific examples of these boronic acid dihalides in addition to those given in the aforesaid more fully detailed examples include alkaneboronic acid dihalides, such as, isobutylboron dichloride, n-amylboron difluoride, n-octylboron dibromide; areneboronic acid dihalides, such as phenylboron dibromide, 1-naphthylboron dichloride, 4-biphenylboron dichloride; alkareneboronic acid dihalides, such as, p-tolylboron difluoride; cycloalkaneboronic acid dihalides, such as, cyclohexylboron dichloride; aralkaneboronic acid dihalides, such as, benzylboron dichloride; haloboronic acid dihalides, such as, 4-chloro-1-butylboron dichloride, fluoromethylboron difluoride; cycloalkylareneboronic acid dihalide, such as p-cyclohexylphenylborondichloride; and the like.

Mixture of the polyfluoroperhalomonoketones or polyfluoroperhalo-1,2-diketones, as well as the requisite boronic acid dihalide reactants, can be used, and, in fact, mixtures of monoketones must be used with the boronic acid dihalides when it is desired to produce a boronic acid diester having different polyfluoroperhalocarbyl ester groups. However, as is usually the case when mixtures of the various coreactants are used, mixtures of closely related products which are inherently difficult to separate are obtained. Accordingly, it is usually preferred to use only one boronic acid dihalide wtih any given polyfluoroperhaloketone or 1,2-diketone.

Using the reaction conditions outlined in the foregoing, there will be obtained from the specific polyfluoroperhaloketones, and 1,2-diketones, and the boronic acid dihalide coreactants just discussed generically and illustrated with suitable specific examples, additional polyfluoroperhalocarbyl boronic acid diesters of the present invention. More specifically, from isobutylboron dichloride and two molar proportions of 2-chloro-2,3,3,4,4-pentafluorocyclobutanone there will be obtained bis(1,2-dichloro-2,3,3,4,4-pentafluoro-1-cyclobutyl) isobutaneboronate. From one molar proportion of amylboron difluoride and 1.0 molar proportion of perfluoro-4,5-octanedione there will be obtained 4,5-perfluorooctylene n-pentaneboronate. From n-octylboron dibromide and two molar proportions of 2,2-dichloro-3,3,4,4-tetrafluorocyclobutanone there will be obtained bis(1-bromo-2,2-dichloro-3,3,4,4-tetrafluoro-1-cyclobutyl) n-octaneboronate. From phenylboron dibromide and 1.0 molar proportion of 3,3,4,4-tetrafluoro-1,2-cyclobutanedione there will be obtained 1,2-dibromo-3,3,4,4-tetrafluoro-1,2-cyclobutylene benzeneboronate. From 1-naphthylboron dichloride and two molar proportions of 2-bromo-2,3,3,4,4-pentafluorocyclobutanone there will be obtained bis(2-bromo-1-chloro-2,3,3,4,4-pentafluoro-1-cyclobutyl) 1-naphthaleneboronate. From p-diphenylboron dichloride and 1,10-dichlorohexadecafluoro-5,6-decanedione there will be obtained 1,10-dichlorohexadecafluoro-5,6-decylene p-phenylbenzeneboronate. From p-tolylboron difluoride and two molar proportions of 13-perfluoropentacosanone there will be obtained bis(13-perfluoropentacosyl) p-methylbenzeneboronate. From cyclohexylboron dichloride and two molar proportions of 9-perfluoroheptadecanone there will be obtained bis(9-chlorotetratriacontafluoro-9-heptadecyl) cyclohexanebonate. From benzylboron dichloride and two molar proportions of perfluoro-3-hexanone there will be obtained bis(3-chlorododecafluoro-3-hexyl) phenylmethaneboronate. From 4-chloro-n-butylboron dichloride and two molar proportions of 1,1,3,3-tetrachloro-1,3-difluoro-2-propanone there will be obtained bis(1,1,2,3,3-pentachloro-1,3-difluoro-2-propyl) 4-chlorobutaneboronate. From fluoromethylboron difluoride and two molar proportions of 4-perfluoroheptanone there will be obtained bis(perfluoro-4-heptyl) fluoromethaneboronate.

The polyfluoroperhalocarbyl boronate esters of the present invention are generically useful as insolubilizing agents for hydroxyl-containing polymers. As illustrated in greater detail in the foregoing examples, these new polyfluoroperhalocarbyl boronate diesters can controllably render such hydroxyl-containing polymers as polyvinyl alcohol insoluble. This water insolubilization is of obvious utility in improving the fields of usefulness of such otherwise limitedly useable polymers as polyvinyl alcohol, partially hydrolyzed polyvinyl acetate, and the like, such as in film and fabric applications. This water insolubilization extends to other hydroxyl-containing polymers, such as, hydrolyzed ethylene-vinyl acetate and acrylonitrile- vinyl acetate copolymers. These organopolyfluoroperhalocarbyl boronate esters are also useful as fabric-modifying agents, for instance in improving the crease resistance of cellulose-based textiles, improving the surface water repellency of similar textiles, improving the shrink resistance of hydroxyl-containing textile materials, and the like.

These new polyfluoroperhaloorgano boronate diesters are also useful as polymer intermediates. They function as dibasic acid components by conventional ester interchange techniques in forming condensation linear polyesters and polyamides, including the polyborasiloxanes of U.S. Patent 2,517,945, and the like. More specifically, when the cyclic boronate ester of Example II, which can also be named 1,2-dichloro-3,3,4,4-tetrafluoro-1,2-cyclobutylene benzeneboronate, was heated under ester interchange conditions with diphenyl silanediol, a solid, linear condensation polyester was formed. This polymer, in contrast to the crosslinked polymers obtained by ester interchange of polyfluoroalkyl borates with diphenylsilanediol, was soluble in benzene and softened at 55° C. Linear polyesters are also obtained by heating polyfluoroperhaloalkyl esters of boronic acids with glycols, such as, ethylene glycol, propylene glycol, 1,6-hexanediol, polyethylene glycol, polytetramethylene glycol, and the like.

What is claimed is:

1. Polyfluoroperhalocarbon boronic acid esters of the group consisting of

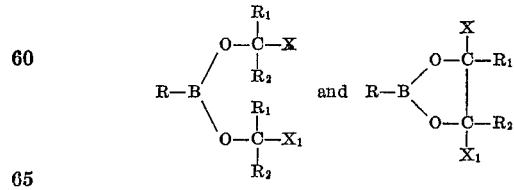

wherein X and $X_1$ represent halogens of atomic number 9 to 53 inclusive; R is aliphatically saturated and represents a member of the group consisting of monovalent hydrocarbon and halohydrocarbon radicals, $R_1$ and $R_2$ are aliphatically saturated and are selected from the group consisting of monovalent fluoroperhalocarbon radicals, when taken separately, and divalent fluoroperhalocarbon radicals, when taken together, said divalent radicals forming a carbocycle of from four to six ring members with the intervening ester carbons.

2. Compounds according to claim 1 wherein R is alkyl and $R_1$ and $R_2$ are aliphatically saturated perfluorocarbon radicals.

3. Compounds according to claim 1 wherein R is aryl and $R_1$ and $R_2$ are aliphatically saturated perfluorocarbon radicals.

4. Compounds according to claim 1 wherein R is alkyl and $R_1$ and $R_2$ are polyfluoroperhaloalkyl radicals.

5. Polyfluoroperhalocarbon boronic acid esters of the formula

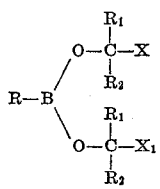

wherein X and $X_1$ represent halogens of atomic number 9 to 53 inclusive; R is aryl and $R_1$ and $R_2$ are polyfluoroperhaloalkyl radicals.

6. Polyfluoroperhalocarbon boronic acid esters of the formula

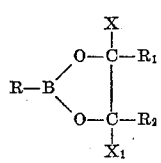

wherein X and $X_1$ represent halogens of atomic number 9 to 53 inclusive; R is aryl and $R_1$ and $R_2$ are polyfluoroperhaloalkyl radicals.

7. Aliphatically saturated bis(polyfluoroperhalocarbon) areneboronates.

8. Aliphatically saturated bis(polyfluoroperhalocarbon) alkaneboronates.

9. Aliphatically saturated polyfluoroperhalocarbon esters of a boronic acid of the formula

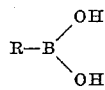

wherein R is aliphatically saturated and represents a member of the group consisting of monovalent hydrocarbon and halohydrocarbon radicals.

10. Bis(1 - chlorohexafluorocyclobutyl)benzeneboronate.

11. Bis(heptafluorocyclobutyl)butaneboronate.

12. Bis(1,2,3-trichloro-1,1,3,3-tetrafluoro - 2 - propyl) benzeneboronate.

13. A process for preparing polyfluoroperhalocarbon esters of a boronic acid of the formula

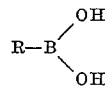

wherein R is aliphatically saturated and represents a member of the group consisting of monovalent hydrocarbon and halohydrocarbon radicals; which comprises reacting a member of the group consisting of aliphatically saturated polyfluoroperhalocarbon monoketone and aliphatically saturated polyfluoroperhalocarbon 1,2-diketone with a boronic acid dihalide of the formula

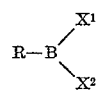

wherein R is aliphatically saturated and represents a member of the group consisting of monovalent hydrocarbon and halohydrocarbon radicals; and $X^1$ and $X^2$ represent halogens of atomic number 9 to 53 inclusive.

14. The process of claim 13 wherein the boronic acid dihalide is an areneboronic acid chloride.

15. The process of claim 13 wherein the boronic acid dihalide is an alkaneboronic acid fluoride.

16. The process of claim 13 wherein the ketone reactant is a polyfluoroperhalocarbon monoketone.

17. The process of preparing bis(1-chlorohexafluorocyclobutyl) benzeneboronate which comprises reacting phenyl dichloroborane with perfluorocyclobutanone.

18. The process of preparing bis(heptafluorocyclobutyl) butaneboronate which comprises reacting n-butyldifluoroborane with hexafluorocyclobutanone.

19. The process of preparing bis(1,2,3-trichloro-1,1,3,3-tetrafluoro-2-propyl) benzeneboronate which comprises reacting phenyldichloroborane with 1,3-dichloro-1,1,3,3-tetrafluoro-2-propanone.

20. The process of preparing 3-phenyl-1,5-dichloro-6,6,7,7-tetrafluoro-2,4-dioxa-3 - borabicyclo[3.2.0]heptane which comprises reacting phenyldichloroborane with tetrafluorocyclobutane-1,2-dione.

21. 3-phenyl-1,5-dichloro - 6,6,7,7 - tetrafluoro - 2,4-dioxa-3-borabicyclo[3.2.0]heptane.

No references cited.